(12) United States Patent
Nobis et al.

(10) Patent No.: US 7,761,252 B2
(45) Date of Patent: Jul. 20, 2010

(54) METHOD AND APPARATUS FOR OPTICAL CHASSIS MEASUREMENT

(75) Inventors: Guenter Nobis, Nuertingen (DE); Volker Uffenkamp, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 142 days.

(21) Appl. No.: 11/949,390

(22) Filed: Dec. 3, 2007

(65) Prior Publication Data

US 2008/0140333 A1 Jun. 12, 2008

(30) Foreign Application Priority Data

Dec. 8, 2006 (DE) .................. 10 2006 058 383

(51) Int. Cl.
*G01C 17/38* (2006.01)
(52) U.S. Cl. ........................................... 702/95
(58) Field of Classification Search .............. 702/85, 702/94, 95, 150
See application file for complete search history.

(56) References Cited

U.S. PATENT DOCUMENTS

| | | | |
|---|---|---|---|
| 6,397,164 B1 | 5/2002 | Nobis et al. | |
| 6,404,486 B1 | 6/2002 | Nobis et al. | |
| 6,710,866 B1 | 3/2004 | Adolph | |
| 6,931,340 B2 * | 8/2005 | Jackson et al. | 702/94 |
| 2006/0152711 A1 | 7/2006 | Dale et al. | |

FOREIGN PATENT DOCUMENTS

| | | |
|---|---|---|
| DE | 197 57 763 | 7/1999 |
| DE | 199 34 864 | 2/2001 |
| DE | 10 2005 063 051 | 7/2007 |
| WO | 98/12503 | 3/1998 |
| WO | 99/34167 | 7/1999 |

\* cited by examiner

*Primary Examiner*—Drew A Dunn
*Assistant Examiner*—Stephen J Cherry
(74) *Attorney, Agent, or Firm*—Michael J. Striker

(57) ABSTRACT

Optical chassis measurement of motor vehicles is carried out by a measuring arrangement equipped with at least one measuring device, in which one or more image capturing devices associated with one another in terms of their position and location record the surface geometry of a vehicle or measurement points arranged on the vehicle, carry out a referencing and/or orientation of the at least one measuring device in relation to the measuring station with reference features that are arranged at particular measuring station coordinates in the measuring station and, based on orientation data and/or association data obtained and based on measurement data obtained during execution of the axle measurement, an evaluation is carried out in an evaluation unit in order to ascertain chassis data. A precise measurement is achieved in that the measuring station coordinates of the reference features are measured once or at chronological intervals by a preset test feature arrangement in the measuring station in that the at least one measuring device sequentially performs an image capture of the test feature arrangement from at least two different points of view, with the reference features to be measured being contained in the captured images and their positions constituting observations in a system of equations, whose unknowns are determined by the evaluation unit through a compensation process.

17 Claims, 1 Drawing Sheet

METHOD AND APPARATUS FOR OPTICAL CHASSIS MEASUREMENT

CROSS-REFERENCE TO A RELATED APPLICATION

The invention described and claimed hereinbelow is also described in German Patent Application DE 102006058383.3 filed on Dec. 8, 2006. This German Patent Application, whose subject matter is incorporated here by reference, provides the basis for a claim of priority of invention under 35 U.S.C. 119(a)-(d).

BACKGROUND OF THE INVENTION

The invention relates to a method for optical chassis measurement of motor vehicles by means of a measuring arrangement equipped with at least one measuring device, in which one or more image capturing devices, which are associated with one another in terms of their position and location and record the surface geometry of a vehicle or measurement points arranged on the vehicle, carry out a referencing and/or orientation of the at least one measuring device in relation to the measuring station with the aid of reference features that are arranged at particular measuring station coordinates in the measuring station and, based on orientation data and/or association data obtained and based on measurement data obtained during execution of the axle measurement, an evaluation is carried out in an evaluation unit in order to ascertain chassis data; the invention also relates to an apparatus for carrying out the method.

A method and apparatus of this kind are disclosed in DE 197 57 763 and also in EP 1 042 643 B1. With these known methods and apparatuses, the axis of travel and geometrical data regarding the wheel and axle are determined with the aid of cameras, a reference coordinate system in the measuring station and optical features (for example retroreflective marks) on the vehicle wheel and chassis. According to DE 197 57 763, the measurement is carried out when the vehicle is at rest, e.g. over a workshop pit or on a car lift, while EP 1 042 643 B1 describes a method in which the vehicle is driven past the measuring device. Both methods simultaneously record the vehicle and a reference feature arrangement, which is equipped with a number of reference features, in order to reference and/or orient the measuring device of the system in relation to the measuring station.

Due to the ever greater technical improvements to chassis designs, determining the wheel and axle geometry of vehicles with a high degree of precision is becoming more and more important. New and more finely tuned possibilities for adjusting the track and camber of individual wheels require a measuring device that functions with a correspondingly high degree of precision. The referencing and orienting of the measuring device in relation to the measuring station are therefore of vital importance.

The (unpublished) German patent application DE 10 2005 063 051, in which even more methods and apparatuses according to the prior part are cited, discloses possibilities for the embodiment and use of the referencing by means of a reference mark arrangement during the chassis measurement.

The reference applications cited above include the requirement that the 3D coordinates of the reference features in a shared coordinate system, i.e. the measuring station system, must be known to the evaluation unit. No indication is given, however, as to how the coordinates are determined.

SUMMARY OF THE INVENTION

The object of the invention is to create a method and an apparatus for optical chassis measurement in motor vehicles, which assure the most precise possible referencing and orienting with the lowest degree of complexity.

This object is attained in that the measuring station coordinates of the reference features are measured once or at chronological intervals by means of a preset test feature arrangement in the measuring station in that the at least one measuring device performs an image capture of the test feature arrangement sequentially from at least two different points of view, with a plurality or all of the reference features to be measured being contained in the captured images and with their positions in the at least two observations constituting the input data for a mathematical system of equations, whose unknowns are determined by the evaluation unit through a compensation process.

The apparatus for carrying out the method is embodied so that in addition, a test feature arrangement is provided, which includes a support with test features mounted on it, and the evaluation unit is embodied so that based on the test features and the reference features to be measured—whose images have been captured from at least two different points of view, it is possible to determine the measuring station coordinates of the reference features. Thus in each image, the measuring device captures the image of only part or all of the test features and at the same time, captures the image of only part or all of the reference features. The capturing of the images from at least two points of view occurs sequentially.

Taking these steps achieves a precise determination of the 3-D coordinates of reference features of a measuring station or measuring room for the referencing/orienting of optical measuring devices in order to measure the wheel and/or axle geometry of motor vehicles by using one of the optical measuring devices of the measuring arrangement (or measuring system). The image capture of the surface geometry or of measuring points situated on the vehicle mentioned in the preamble to claim 1 relates to all types of optical axle measurement, e.g. mark-based or markless axle measurement, which work with at least one image capturing apparatus equipped with at least one camera.

The 3D coordinates (or also 2D coordinates) of the reference features in the measuring station system are required in the initial installation, but are advantageously also subjected to a periodic check. A new determination of the coordinates is also required after a replacement of reference features, e.g. after damage or loss. The measurement can be carried out by service personnel or by the operator that also performs the chassis measurement. No prior expertise is required.

The determination of the measuring station coordinates of the reference features by means of the steps mentioned above yields a high degree of precision, thus permitting the subsequent optical axle measurement to also be carried out with a high degree of precision. This applies especially to measuring apparatuses equipped with more than one measuring device, e.g. one measuring device for each side of the vehicle or one for each individual wheel, whose measurement data are captured separately; the determination of the chassis data, however, results from a combined reckoning of the 3-D data from the individual measuring devices. This also applies to the mobility of the at least one measuring device in relation to the arrangement in the measuring station.

The method and apparatus are based on the following considerations: a measuring station surface for axle measurement has an approximate span of 5.0 m×2.5 m. For reasons of precision and visibility of the individual wheels, as a rule either one measuring device is used per side of the vehicle or one measuring device is used per vehicle wheel, each of which records only a corresponding section of the vehicle. Since the object sections do not overlap or only overlap slightly, each measuring device requires at least three reference features in its own field of view. This process can be rendered more difficult if the features are embodied in the form of flat features that have a normal direction extending in the recording direction of the measuring device so that they are not visible to opposing measuring devices. Obscured sightlines caused by the vehicle or the car lift can also complicate a combined detection. The expanse of the reference features thus extends over the entire area of the measuring station; often they are only attached where the measuring devices are located, i.e. in the vicinity of the four corners of the measuring station in a system equipped with one measuring device for each individual wheel.

One advantage of the invention lies in using at least one measuring device equipped with at least one camera of the measuring system, which camera records only a very small object section, to determine 3D coordinates of the above-mentioned expanse (or an even larger area) in a consolidated measuring station coordinate system; in particular, a concatenation of distantly spaced and opposing features is easily resolved.

The operation during the determination of the measuring station coordinates of the reference features benefits from the fact that the test features of the test feature arrangement are kept in a defined spatial position on a mobile or stationary support and the test feature arrangement and the at least one support are kept stationary at least during the time that the method is being carried out.

Advantages in the operation and evaluation are achieved in that the test features and/or the reference features are automatically identified by the evaluation unit by means of an associated coding.

The operation and measuring are also simplified by the fact that the test features are detected from two opposing sides, at least three of the test features of the two sides being definitively concatenated with one another.

The precision can be increased in that geometric information about the test features with regard to the embodiment, coordinate system, and/or reciprocal spacing is known to the evaluation unit and is also taken into account in the compensation process.

The precision of the determination of the 3D coordinates of the reference features is increased by the fact that additional parameters, for example the camera parameters or the parameters of the reciprocal association of a plurality of image capturing devices of a measuring device, are also determined during the compensation process.

Advantages also result from the fact that in a measuring arrangement equipped with one measuring device per wheel or per side of the vehicle, the test feature arrangement is used to concatenate the reference features of one side from front to rear and/or to concatenate the reference features from one side of the vehicle to the other.

In one approach, the combination of at least a part of the test features and the relevant reference features is sequentially detected in that the position and/or orientation of the at least one measuring device is changed at least once and the at least one additional detection is executed from a different point of view.

In the event that practical conditions prevent all of the reference features and test features from being simultaneously detected in two images captured from different points of view, then complete detection and achievement of precision are increased by the fact that the detection from more than two points of view is selected—thus yielding an image composite that has overlapping images and in which all of the reference features and test features are finally depicted—and are also increased by the fact that the images are captured from points of view with the same or varied increments and are evaluated jointly in a single process.

Various advantageous embodiment possibilities are comprised in that the sequential detection is executed with incremental or continuous position and/or orientation change of the measuring device and in that the image data thus obtained are either evaluated completely or, before the evaluation occurs, are reduced by the system as a function of the guaranteed precision required.

The fact that the capturing of the images occurs automatically or by being triggered by an operator offers a wide variety of possibilities for operation. Another advantageous embodiment that contributes to the reliable recognition of the test features and reference features is comprised in the fact that several images are captured from the same or different points of view in different lighting conditions, in particular at different intensities of light.

The precision in the determination of the reference feature coordinates is also promoted by the fact that after repeated detection from a single point of view, the image coordinates of the test features and/or reference features are averaged.

Various embodiment possibilities for reliable recognition of test features are comprised in that the test features are embodied as reflective or luminous.

Ease of operation is promoted by the fact that the evaluation unit assists the operator visually and/or acoustically during operation.

One advantageous means for determining the measuring station coordinates is also comprised in that the captured images for determining the measuring station coordinates of the reference features are evaluated in accordance with a statistical compensation process.

According to another embodiment, after the measuring station coordinates of the reference features are determined, the evaluation unit subjects them to a plausibility test and the testing station coordinates determined are only adopted as a basis for the chassis measurement if the criteria on which the plausibility test is based are determined to be appropriate, thus further increasing the reliability of the measurements.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
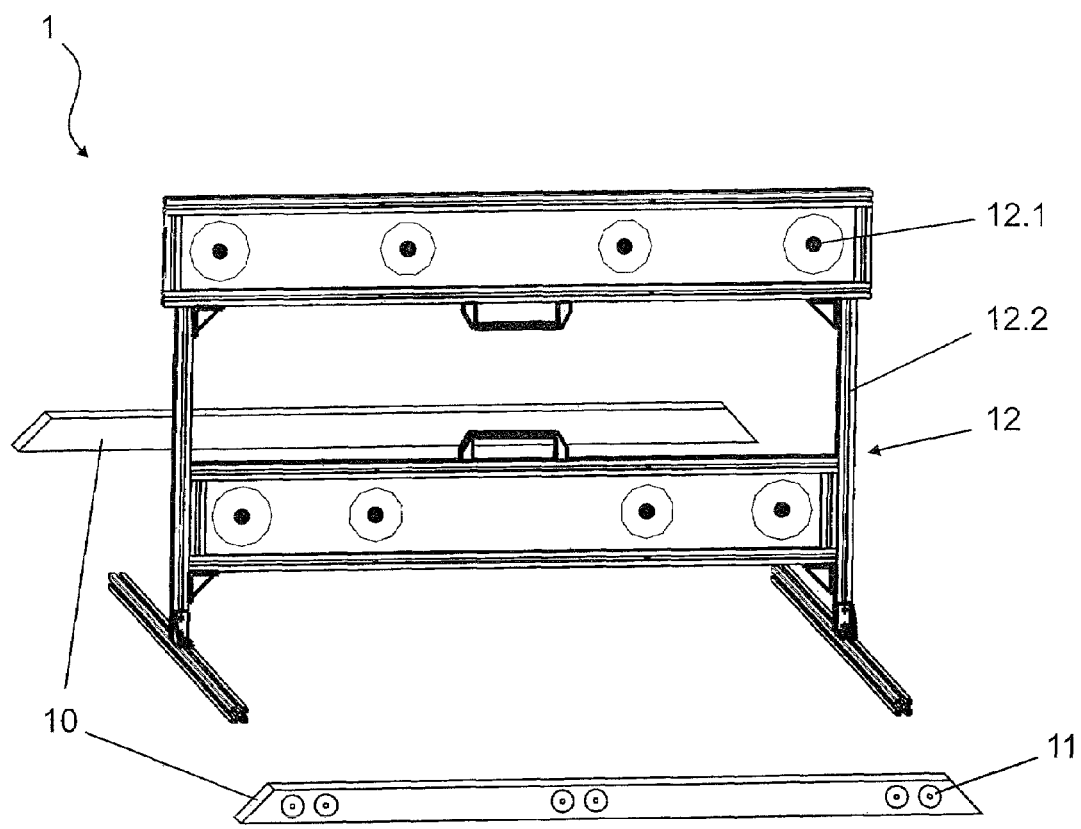
FIG. 1 is a perspective view of a feature arrangement equipped with reference features and test features at measuring station in accordance with the present invention.

FIG. 1 shows a reference feature arrangements 10 situated in a measuring station 1 for a chassis measurement of a motor vehicle and positioned or to be positioned on both sides of the measuring station, having reference features 11 attached to a holding device and having a test feature arrangement 12 that is equipped with test features 12.1 situated on a frame that will be referred to below as a support 12.2. The reference features 11 can, for example, be situated on a lateral boundary part of a car lift. In the measuring station, the feature arrangement 10 can, for example, include two or three such supports in accordance with the size of the measuring station.

Figure 2:
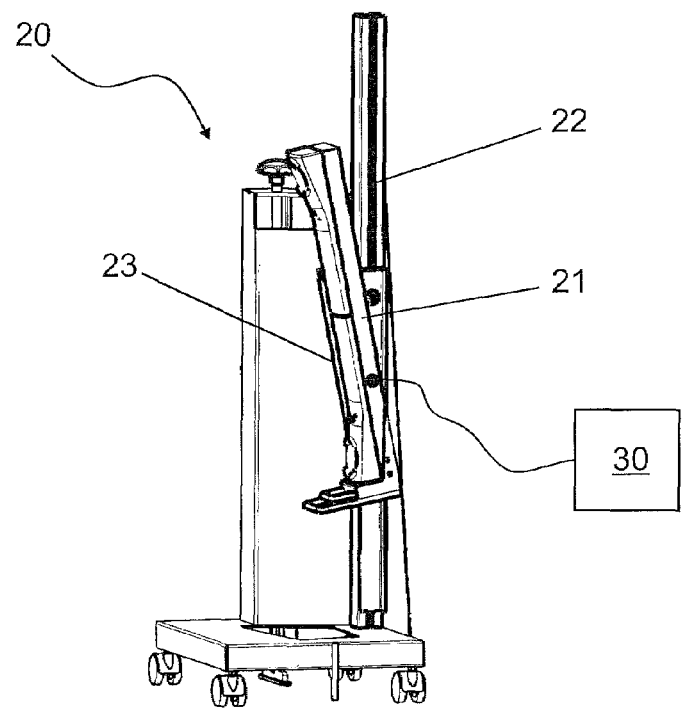
FIG. 2 is a perspective view of a measuring device in accordance with the present invention.

FIG. 2 shows a measuring device 20 with a measuring unit 23 that is supported in a vertically adjustable fashion on a vertical adjuster 22 and is supported in a tiltable fashion on a tilt adjuster 21. The measuring device 20 has at least one image capturing device that captures an image of the relevant section of the measuring station 1, possibly including the vehicle and features attached to it such as wheel and/or chassis features, and is coupled to an evaluation unit 30 for processing image data and for determining the measuring station coordinates of the reference features to be measured. This evaluation unit can also be used for evaluating and preparing the measurement results for the chassis measurement. For a description of the execution of the chassis measurement, the reader is referred to the references cited at the beginning. The determination of the measuring station coordinates of the reference features will be explained in greater detail below.

As its test features 12.1, the support 12.2 preferably has features such as 2D surfaces or 3D bodies of known geometry, for example each in the form of a respective mark shaped like a circle, a triangle, a rectangle, a sphere, a cube, a block, or the like, which have a good contrast in relation to their surroundings, possibly through the use of special lighting conditions, and are in particular embodied in the form of artificial, preferably retroreflective features. Features of this kind offer the advantage that they can be detected in the image with particular ease and, thanks to their known geometry, it is possible to achieve a high degree of measurement precision. The test features 12.1 and the reference features 11 as well can be associated with a coding in order to facilitate their identification.

By contrast with 3D features, flat features cannot be detected from all image-capture directions. For this reason, when flat features are used, it is useful to affix features to both sides of the support or point frame 12.2 and where applicable, to produce a concatenation of the two sides of the support 12.2, e.g. through at least three locating holes that do not lie along a straight line.

Alternatively, three-dimensional features such as spheres that are visible from both sides and function as test features 12.1 (and reference features 11 where appropriate) can be situated on the support 12.2. It is also possible to provide a combination of flat and three-dimensionally salient features.

In addition, it is possible for natural features that are present anyway to be used as the features, e.g. edges or random contrast patterns that are produced by a texture of the frame. It is also possible to use a combination of natural and artificial features.

In addition, it is possible for geometrical information about the test features on the support 12.2 to be known and adopted as a basis in the evaluation unit 30, e.g. the distance between test features or the coordinates of the test features in a local 2D or 3D coordinate system of at least one part of the test feature arrangement. When available, this information is fed into the mathematical evaluation in the evaluation unit 30, and in particular, is fed into a compensation process with corresponding tolerances.

The at least one support 12.2 is set up to be stationary at least for the duration of the determination of the 3D coordinates of the reference features. It is placed so that from at least two points of view, an image is captured of at least part of the reference features to be determined, together with at least part of the point features 12.1. The support 12.2 must not be moved until images have been captured from all of the points of view that are necessary or are to be established. A 3-point support or a torsionally flexible construction of the support elements with a 4-or-more-point support assures a tilt-free setup.

In addition to the concatenation of the side references from front to rear and from left to right (for example in relation to a system with one measuring device 20 per wheel), the support 12.2 is used for better exploiting the image format and thus increasing the precision. The detection of the features (reference features 11 and test features 12.1 on the support 12.2) occurs sequentially in that the at least one measuring device 20 undergoes at least one position change from which the at least second image capture is executed from another point of view.

Due to the smaller object section and the large expanse of the object, the at least one measuring device 20 is suitably repositioned several times so that an image composite is produced, with a plurality of partially overlapping images in which all points have in the end been captured from at least two points of view.

With a visible object section of the measuring device of approx. 1 m within the approximately 5-meter longitudinal span of the measuring station, it is useful, for example, to begin the detection at the front left and front right, to then shift the measuring device by 0.25 m each time, finally finishing at the rear end of the measuring station 1. These image sequences or scans can be executed several times and with varying increments in order to improve precision, whereupon all of the images can be evaluated jointly in a single process. It is thus possible to change the height and the recording direction of the measuring device, in particular the horizontal recording direction and the vertical recording direction (inclination).

Advantageously, auxiliary adapters with predefined directions and inclinations can be used, which preset the measuring device 23 to a predefined height and orientation, thus assuring a degree of precision that is largely independent of the operator.

The image capture can occur continuously. The images thus produced are either evaluated completely or are reduced by the measuring system, in particular the evaluation unit 30, to the quantity required to guarantee the necessary precision.

Alternatively, the operator triggers the image capture after having placed the measuring device into the next position and orientation. This limits the image data to the smallest amount required.

If the measurement distance between the reference features 11 and the support 12.2 is different, particularly in the case of passive features that are illuminated by an annular light of the measuring device 20 for example, the detection of the features can be carried out with varying lighting intensity in each position of the measuring device so that the features are optimally lit in both the foreground and the background. Since this process involves static objects and is based on the prerequisite that the measuring device 20 is not moved during the recording in one position, the image coordinates of the features can also be averaged. This process reduces image noise, thus likewise achieving an increase in precision. Alternatively, it is also possible to use actively luminous features.

The operator can be provided with assistance during the image capture. The current position, height, direction, and inclination, calculated based on the evaluation of the visible points on the point frame 12.2, can be displayed in an online fashion on the monitor of the measurement system. This allows the operator to very easily move the measuring device 20 to the next required recording position and allows the measuring system to set the number of image captures and the overlap that it requires to assure precision. It is also possible for an interactive operator guidance and monitoring to be provided with regard to the proper use of the at least one auxiliary adapter by the system.

The evaluation of images is carried out in accordance with a statistical compensation process, since as a rule, the unknowns are arrayed opposite a large number of observations that are produced from the network of captured images. At the same time, it is also possible to influence and calibrate other parameters, e.g. the camera parameters or the parameters of the reciprocal association of the image capturing units of a measuring device.

In the determination of the measuring station coordinates of the reference features, the at least one measuring device 20 sequentially captures images of the support 12.2 equipped with the test features 12.1 from at least two different points of view. The images likewise include the reference features 11 to be measured. The positions of the features in the images constitute the observations in a system of equations whose unknowns are as a rule determined by means of overdetermination in conjunction with the compensation process.

After the desired measuring station coordinates of the reference features 11 have been determined, they can be tested for plausibility, e.g. for completeness and spacing. The achieved precision of the coordinates in the form of standard deviations from the evaluation of the overdetermined system can also be used for the testing. Only when all of the criteria have been positively checked are the coordinates adopted into the measuring system, in particular the evaluation unit 30. This assures the correctness and precision of the measuring system in chassis measurement, for example axle measurement, even when it is being used by non-specialists.

It will be understood that each of the elements described above, or two or more together, may also find a useful application in other types of methods and constructions differing from the type described above.

While the invention has been illustrated and described as embodied in a method and apparatus for optical chassis measurement, it is not intended to be limited to the details shown, since various modifications and structural changes may be made without departing in any way from the spirit of the present invention.

Without further analysis, the foregoing will so fully reveal the gist of the present invention that others can, be applying current knowledge, readily adapt it for various applications without omitting features that, from the standpoint of prior art, fairly constitute essential characteristics of the generic or specific aspects of this invention.

The invention claimed is:

1. A method of optical chassis measurement of motor vehicles, comprising the steps of providing a measuring arrangement equipped with at least one measuring device; associating image capturing devices with one another in terms of their position and location and recording by the one or more image capturing devices a surface geometry of a vehicle or measurement points arranged on the vehicle; carrying out a step selected from the group consisting of a referencing, an orientation, and both of the at least one measuring device in relation to a measuring station with use of reference features that are arranged or present at particular measuring station coordinates in the measuring station; based on orientation data and/or association data obtained and based on measurement data obtained during execution of an axle measurement, carrying out an evaluation in an evaluation unit in order to ascertain chassis data; and measuring measuring station coordinates of the references features once or at chronological intervals by a preset test feature arrangement in the measuring station in that at least one measuring device performs an image captured of a test feature arrangement from at least two different points of view, with the reference features to be measured being contained in captured images and with positions of the test features and reference features recorded by the measuring device constituting observations in a system of equations, whose unknowns are determined by the evaluation unit through a compensation process; and executing a sequential detection with incremental or continuous position and/or orientation changes of the measuring device; and evaluating completely image data thus obtained or reducing image data thus obtained by an evaluation system as a function of a guaranteed precision required.

2. A method as defined in claim 1; and further comprising keeping at least part of the test features of the test feature arrangement in a definite spatial position in a local coordinate system selected from the group consisting of a local 2D coordinate system and a local 3D coordinate system, on a support selected from the group consisting of a mobile support and a stationary support.

3. A method as defined in claim 1; and further comprising identifying features selected from the group consisting of the test features, the reference features, and both, by an associated coding.

4. A method as defined in claim 1; and further comprising detecting the test features from two opposite sides, with at least three of the test features of the two sides being definitely concatenated with one another.

5. A method as defined in claim 1; and further comprising providing a known geometric information about the test features with regard to parameters selected from the group consisting of embodiment, coordinate system, reciprocal spacing, and combinations thereof; and taking the geometric information into account in a compensation process.

6. A method as defined in claim 1; and further comprising determining during a compensation process additional parameters selected from the group consisting of camera parameters and parameters of a reciprocal association of several image capturing devices of the measuring device.

7. A method as defined in claim 1; and further comprising equipping the measuring arrangement with one measuring device per wheel or per side of the vehicle; using the test feature arrangement to concatenate the reference features in a manner selected from the group consisting of to concatenate the references features from one side from front to rear, to concatenate the reference features from one side of the vehicle to the other, and both.

8. A method as defined in claim 1; and further comprising selecting the detection from at least two points so that an image composite with at least two overlapping images is produced, which in an end includes all detected points, recorded from the at least two points of view.

9. A method as defined in claim 1; and further comprising producing an image composite with a plurality of images that are recorded from different points of view, with a same or varied increments; and evaluating them jointly in a single process.

10. A method as defined in claim 1; and further comprising performing capturing of the images in a manner selected from the group consisting of capturing the images occurred automatically and capturing the images being triggered by an operator.

11. A method as defined in claim 1; and further comprising capturing several images from a same or different points of view in different lighting conditions, in particular at different intensities of light.

12. A method as defined in claim 1; and further comprising using as test features selected from the group consisting of 2D surfaces and 3D bodies.

13. A method as defined in claim 1; and further comprising embodying the test features as features selected from the group consisting of reflected test features and luminous test features.

14. A method as defined in claim 1; and further comprising assisting an operator by the evaluation unit during operation in a manner selected from the group consisting of visually, acoustically, and both.

15. A method as defined in claim 1; and further comprising evaluating the captured images or composite captured images for determining the measuring station coordinates of the reference features, in accordance with a statistical compensation process.

16. A method of optical chassis measurement of motor vehicles, comprising the steps of providing a measuring arrangement equipped with at least one measuring device; associating image capturing devices with one another in terms of their position and location and recording by the one or more image capturing devices a surface geometry of a vehicle or measurement points arranged on the vehicle; carrying out a step selected from the group consisting of a referencing, an orientation, and both of the at least one measuring device in relation to a measuring station with use of reference features that are arranged or present at particular measuring station coordinates in the measuring station; based on orientation data and/or association data obtained and based on measurement data obtained during execution of an axle measurement, carrying out an evaluation in an evaluation unit in order to ascertain chassis data; and measuring measuring station coordinates of the references features once or at chronological intervals by a preset test feature arrangement in the measuring station in that at least one measuring device performs an image captured of a test feature arrangement from at least two different points of view, with the reference features to be measured being contained in captured images and with positions of the test features and reference features recorded by the measuring device constituting observations in a system of equations, whose unknowns are determined by the evaluation unit through a compensation process; and after repeated direction of a single point of view, averaging image coordinate selected from the group consisting of image coordinates of the test features, image coordinates of the reference features, and both.

17. A method of optical chassis measurement of motor vehicles, comprising the steps of providing a measuring arrangement equipped with at least one measuring device; associating image capturing devices with one another in terms of their position and location and recording by the one or more image capturing devices a surface geometry of a vehicle or measurement points arranged on the vehicle; carrying out a step selected from the group consisting of a referencing, an orientation, and both of the at least one measuring device in relation to a measuring station with use of reference features that are arranged or present at particular measuring station coordinates in the measuring station; based on orientation data and/or association data obtained and based on measurement data obtained during execution of an axle measurement, carrying out an evaluation in an evaluation unit in order to ascertain chassis data; and measuring measuring station coordinates of the references features once or at chronological intervals by a preset test feature arrangement in the measuring station in that at least one measuring device performs an image capture of a test feature arrangement from at least two different points of view, with the reference features to be measured being contained in captured images and with positions of the test features and reference features recorded by the measuring device constituting observations in a system of equations, whose unknowns are determined by the evaluation unit through a compensation process; and after determination of the measuring station coordinates of the reference features, subjecting them by the evaluation unit to a plausibility test; and only adapting the determined testing station coordinates as a basis for a chassis measurement if criteria on which the plausibility test is based are determined to be appropriate.

* * * * *